March 9, 1954 N. LESTER 2,671,246

MOLD OVERLOAD COMPENSATOR

Filed July 16, 1949

INVENTOR.
NATHAN LESTER
BY
Oberlin & Limbach
ATTORNEYS.

Patented Mar. 9, 1954

2,671,246

UNITED STATES PATENT OFFICE 2,671,246

MOLD OVERLOAD COMPENSATOR

Nathan Lester, Shaker Heights, Ohio, assignor to Lester Engineering Company, Cleveland, Ohio, a corporation of Ohio Application July 16, 1949, Serial No. 105,251

6 Claims. (Cl. 18—30)

1

The present improvement relate generally as indicated to a mold overload compensator and more particularly to a unique method of and apparatus for controlling the pressure buildup of material injected into the mold of an injection molding, pressure casting, extruding, or transfer molding machine within desired limits for precluding the possibility of separation of the mold blocks at the parting line and resulting flashing of the material thereat and for enabling the use of existing machines for forming pieces of larger cross-section in the parting plane of the molds than has been possible heretofore and the design of new machines of lighter construction than comparable machines now required.

In general, injection molding of thermoplastic material, for example, involves feeding of a metered quantity of material in pellet or like solid form into a heating or plasticizing chamber through which and wherefrom said material is forced as by a hydraulically actuated plunger through a discharge nozzle at one end of the chamber and through the sprue, gates, and runners of a closed mold into the mold cavity formed between the mold blocks or parts. Said plasticizing chamber usually comprises a heated cylinder provided with a spreader (also preferably heated) operative to relatively thinly spread the material so that it will rapidly pick up heat from the cylinder and spreader walls and thereby be transformed to a thick semi-fluid mass just before it flows through said discharge nozzle. Said mold generally comprises separable parts or blocks forming a mold cavity therebetween and is actuated through a hydraulic ram and toggle link mechanism which applies a relatively great clamping force on the mold parts so as to resist parting thereof due to the building up of the pressure of the material in the mold cavity.

As an illustrative example, it is evident that in a machine capable of exerting a pressure of 30,000 p. s. i. on the material in the heating chamber and a closing force on the mold of 600 tons and having a mold in which the cavity is 170 in.² in the parting plane, separation of the mold parts will occur shortly after the mold cavity is filled and as soon as pressure of the mold material therein exceeds about 7,000 p. s. i., thereby causing flashing of the mold and possible overstressing of certain parts of the machine, particularly under conditions where the material is overheated and would attain a pressure of about 90% of the pressure exerted on the material in the plasticizing chamber except for the relief provided by the separating of the mold parts.

2

Accordingly, in order to eliminate such objectionable separation and flashing of the mold in the absence of a suitable control, either the injection pressure or the size of the molding cavity must be reduced to a low value of less than one-fourth of that indicated or else the machine must be correspondingly strengthened with respect to the frame and the mold closing mechanism. However, rather than cutting down the high pressure in the plasticizing chamber which it is desirable to maintain for properly conditioning the plastic material and for shortening the injection cycle and rather than rendering the machine unduly large and bulky relative to the size of the mold usable therewith, it is herein proposed to employ high pressure injection and to take advantage of that characteristic of injection molding machines which permits high pressure compression of the material in the plasticizing chamber for the purposes aforesaid without causing application of undue pressure in the mold so long as the mold is only partly filled and the material is moving thereinto. As evident, so long as there is any movement of the material from the plasticizing chamber into the mold, the pressure within the mold will be so low that it is virtually impossible to flash the mold at that time, the pressure being low because of the pressure drop in the plasticizing chamber, the nozzle, and the sprue, gates and runners of the mold. Then upon filling of the mold cavity, it has been discovered that the pressure required to be held on the material as it sets up in the mold need only be a minor fractional portion of the pressure required to fill and form the material; and as a result high pressure can be applied on the material during substantially the entire injection stroke and followed by a lower adjustable holding pressure to keep the material from shrinking within the mold as it sets up therein. Such lower pressure permits the use of larger molds with present apparatus and enables the design of new apparatus of considerably lighter construction and without flashing of molds as heretofore encountered.

Hitherto, and as disclosed in my prior patent #2,433,132, dated September 23, 1947, this problem has been solved by the provision of a control or mold overload compensator which is actuated to reduce the pressure on the material in the mold upon minute separating movement of the mold parts.

In the present case, a solution is worked out from a different aspect, viz. incorporating a time control circuit in which, upon lapse of a predetermined time period following the initiation of the injection stroke, a reduced pressure is applied and maintained on the material injected into the mold.

Briefly outlined, the present method involves feeding of a predetermined quantity of solid material into the plasticizing chamber, applying a predetermined pressure on the material as by a hydraulically actuated ram, accurately controlling the temperature of the plasticizing chamber, making one or more test pieces with the mold held in a closed position by predetermined force, and recording the time periods at which flashing of the mold commences. Having tabulated the test results for a prescribed mold, material, temperature and pressure, a timing device operatively connected in the control circuit of the machine and arranged to be energized upon starting of the injection stroke may be set to reduce the pressure on the material in the mold at a time between filling of the mold and separation of the mold parts.

Accordingly, it is among the primary objects of this invention to provide a unique method of injection molding and a novel apparatus in which the signal for reducing the injection pressure is given by a timing device which has been set in relation to the time required to fill the mold and to attain a predetermined pressure therein.

It is another object of this invention to provide a unique method and apparatus for predeterminedly reducing the pressure of the material in the mold during setting thereof whereby, in instances where flashing of the mold is not likely or possible because of the relatively small cross-sectional area of the molded articles in the parting plane of the mold parts, the application of such reduced pressure on the material subsequent to filling of the mold eliminates the problem of sticking of the molded or cast articles in the mold. The prior practice in such cases has been simply to reduce the injection pressure ab initio but this introduces other problems which result in inferior molded articles.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail several illustrative embodiments of the invention, these being indicative, however, of but a few of the various ways in which the principle of the invention may be employed.

In said annexed drawing—

Figure 1:
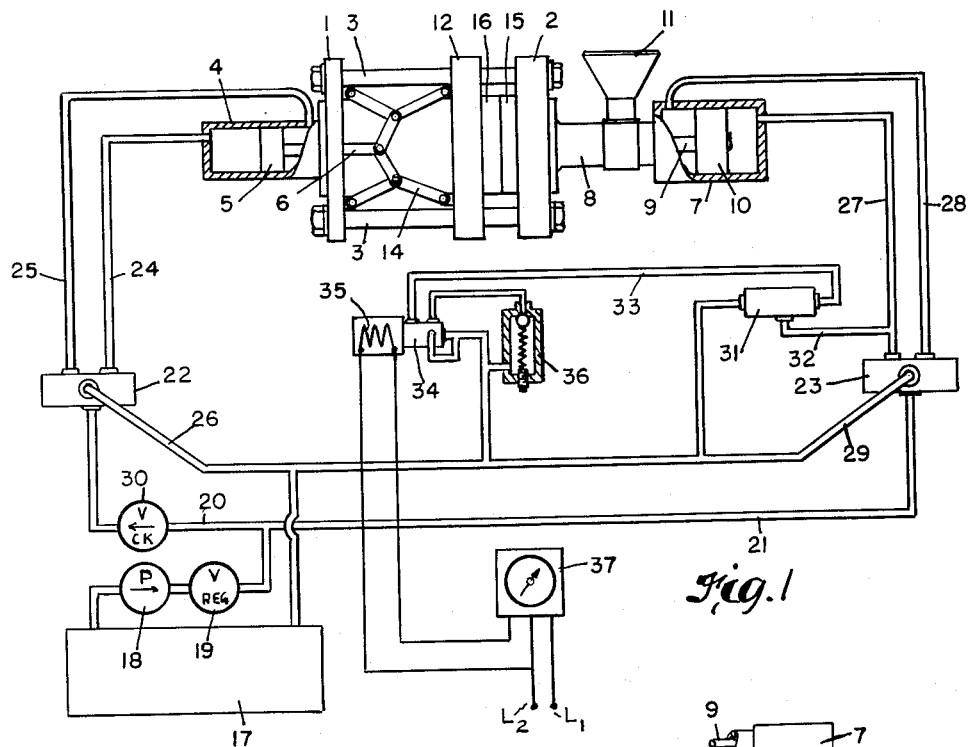
Fig. 1 is a schematic diagram of one embodiment of this invention.

The injection molding machine illustrated in Fig. 1 comprises members 1 and 2 secured together in spaced relation as by a plurality of parallel tie-bars 3 extending from one member to the other, said member 1 having mounted thereonto a mold closing cylinder 4 with a piston 5 reciprocable therein and having its rod 6 extending toward said member 2. Said member 2 herein constitutes the fixed platen of the machine and carries the injection cylinder assemblage 7 thereon, said assemblage including a heating or plasticizing cylinder or chamber 8 outwardly adjacent the fixed platen 2 in which chamber the injection plunger 9 constituting the piston rod of the piston 10 in cylinder 7 is reciprocable and a material supply hopper 11 into which solid thermoplastic material is adapted to be loaded and dispensed in metered quantity into the plasticizing chamber 8 in advance of the inner end of plunger 9 when said plunger is retracted toward the right as viewed in Fig. 1.

Mounted for sliding movement on the tie-bars 3 and between member 1 and fixed platen 2 is a movable platen 12 actuated toward and away from said fixed platen 2 by piston 5 and a double toggle mechanism 14 pivotally connected as shown to the piston rod 6, to the member 1, and to the movable platen 12, said mechanism being arranged to effect a large multiplication of the force exerted by piston 5 whereby to enable tight clamping together of the mold parts 15 and 16 which are respectively attached to the platens 2 and 12 for resisting separation of the mold parts upon filling of the mold cavity which is defined by said mold parts with material injected from the plasticizing chamber 8.

The typical hydraulic system for controlling said pistons 5 and 10 comprises a reservoir 17, a motor driven pump 18 having its intake side connected to said reservoir and having a pressure regulating valve 19 associated therewith for maintaining a predetermined pressure in the lines 20 and 21 which are connected to the respective cylinders through the intermediary of conventional four-way reversing valves 22 and 23. Valve 22 is selectively operative to direct fluid under pressure through one of the lines 24 and 25 to control the direction of actuation of piston 5 in the mold closing cylinder 4 and to return the fluid displaced by said piston through the other of said lines, through said valve 22 to the reservoir 17 by way of line 26. The other valve 23 is similarly selectively operative to direct fluid under pressure from line 21 through either of the lines 27 or 28 to correspondingly actuate the injection cylinder piston 10 in a desired direction and to return the fluid displaced by the movement of said piston through the other of said lines, through said valve 23 and line 29 to the reservoir 17. A check valve 30 is preferably interposed in the pressure line 20 which leads to the four-way valve 22 to maintain a desired mold closing pressure irrespective of the reduced pressure which is subsequently applied on the injection cylinder piston 10 as will hereinafter appear. It will be apparent to those skilled in the art that said four-way valves 22 and 23 may be either manually actuated or, if desired, they may be automatically operated in timed sequence by appropriate solenoids, cams, or other well-known expedients.

The injection pressure control herein depicted includes a relief or bleeder valve 31 in a branch line 32 connected to the injection cylinder line 27 which leads to the head end of the injection cylinder 7, said relief valve being of conventional form having a valve member therein (not shown) which is retained in a seated position by a body of fluid acting on said valve member and trapped in the line 33 between said relief valve 31 and a solenoid operated valve 34, the latter being operative when the solenoid 35 is energized to establish communication between the line 33 and a pilot relief valve 36 which is set to open at any desired pressure between zero and the maximum pressure in line 27. Therefore a build up of fluid pressure in lines 21 and 27 to such predetermined pressure to which the pilot relief valve 36 is set will permit unseating of the valve member in said relief or bleeder valve 31 and cause a consequent reduction in the fluid pressure in line 27 thereby reducing the pressure applied on the material in chamber 8 and in the mold 15—16.

Energization of solenoid 35 is effected by a timing device 37 which is set in operation upon initiation of the injection stroke of plunger 9 and after the mold 15—16 has been closed; and after a lapse of time determined by the setting of said device a switch therein (not shown) will be closed to thus complete the electric circuit including said solenoid 35. Obviously, said timing device may be of any well-known type such as, for example, the synchronous motor type, the temperature responsive type in which there is a variable resistance in the heater circuit of a thermionic tube, the dashpot type or the vacuum tube type having a potentiometer and condensor network in the grid circuit and a relay in the anode circuit. As an alternative it may, in some instances, be desirable to consider the time period as being that which lapses between the starting of injection plunger 9 on its injection stroke and a predetermined position at which latter position a limit switch or the like is actuated to close the solenoid circuit. In such case, the build up of a desired maximum pressure in the mold using a prescribed material and quantity thereof heated to a prescribed temperature and injected at a prescribed pressure will occur at a certain position of the injection plunger and it is at this position that the limit switch is actuated by the plunger.

As previously indicated, one method of determining the time period for which the timing device 37 is to be set is to first make test runs with a certain material under prescribed conditions of temperature and pressure, and with a particular mold and to observe the time lapse between starting of the injection stroke and flashing of the mold, and setting the timing device accordingly.

Figure 2:
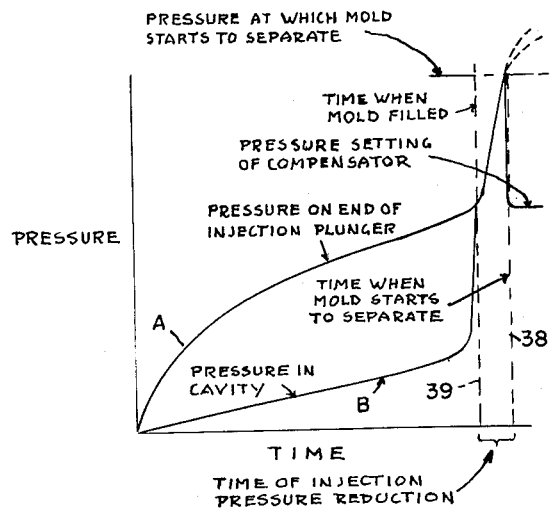
Fig. 2 illustrates typical curves of the pressure of the material in the plasticizing chamber and in the mold cavity plotted against time.

In Fig. 2 the curve A is the pressure of the material in the plasticizing chamber plotted against time and the curve B is the pressure of the material in the mold cavity also plotted against time. As shown, the pressure of the material in the plasticizing chamber more or less progressively increases during the injection stroke and then abruptly increases to maximum upon filling of the mold. Likewise, the pressure of the material in the mold cavity is relatively low during the major portion of the mold cavity filling operation and then abruptly rises to a maximum when the mold cavity is filled. The pressure to which the material in the mold cavity rises during the filling operation may vary between 30-90% of the pressure which is built up in the plasticizing chamber depending upon the material and the temperature to which it is heated and other factors which need not be here considered. However, as soon as the mold cavity is filled, the pressure of the material in the plasticizing chamber and mold cavity become substantially equal as shown whereupon continued actuation of the injection plunger would cause the pressure in the cavity to exceed the force holding the mold closed, thereby causing separation of the mold parts and flashing of the material. In any case, if the pressure at which the mold parts 15 and 16 commence to separate is at a time as indicated by the dash line 38 in Fig. 2 and the mold is filled at a time indicated by the line 39, then the timing period for which the timing device 37 is to be set should be between the lines 38 and 39. As shown in Fig. 2, operation of the timer 37 causes immediate reduction in the pressure applied on the material to a desired holding value insufficient to flash the material.

The operation of the Fig. 1 control described above after having set the timing device 37 is as follows.

The four-way valve 22 is actuated to direct fluid under pressure from line 20 and through line 24 to the head end of the mold closing cylinder 4 to move the piston 5 therein toward the right to thus clamp together the mold parts 15 and 16. With the injection plunger 9 retracted toward the right, a measured quantity of material is fed from the hopper 11 into the plasticizing chamber 8. The four-way valve 23 is then actuated to direct fluid under pressure from line 21 and through line 27 into the head end of the injection cylinder 7 to thus urge the injection plunger 9 toward the left to cause the material in the plasticizing chamber 8 to be forced through and plasticized in said chamber and thence forced into the mold cavity formed between the mold parts 15 and 16. The starting of the injection stroke of said plunger 9 starts a timing device 37 to run for its pre-set period. Upon lapse of such period and build up of pressure of the material in the plasticizing chamber and mold, the solenoid 35 is energized and the pilot valve 36 unseats whereby the relief or bleeder valve 31 opens to predeterminately reduce and maintain such reduced pressure during the setting of the material in the mold cavity. Thereupon the four-way valves 22 and 23 are shifted to a reverse position to return the injection plunger 9 toward the right to allow the next charge of material to be fed into the plasticizing chamber 8 and to return the mold closing cylinder piston 5 to the left to separate the mold parts 15 and 16 to permit ejection or removal of the molded article and to de-energize the timing device 37 and the solenoid 35 and thereby restore the control to a condition for repeating the cycle.

Figure 3:
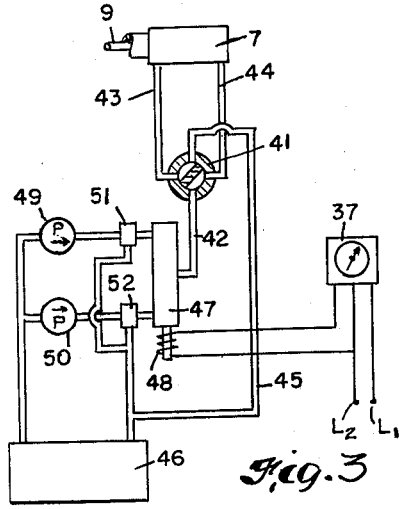
Fig. 3 is a schematic diagram of a modification.

In the embodiment of the invention illustrated in Fig. 3 the reciprocation of the injection plunger 9 in cylinder 7 is controlled as by any conventional reversing valve 41 operative to selectively direct fluid under pressure in line 42 into one end of the injection cylinder through line 43 or 44 and to discharge the fluid from the other end of said cylinder through line 45 leading to the reservoir 46. The fluid pressure system herein disclosed comprises a solenoid operated selector valve 47 of any desired construction and operative when the solenoid 48 is de-energized to cause fluid delivered by the high pressure pump 49 to flow through said valve 47 into line 42 and when the solenoid 48 is energized to cause fluid delivered by the pump 50 operating at a selected lower pressure than pump 49 through said valve 47 into line 42. Associated with pumps 49 and 50 are the unloading valves 51 and 52 respectively which not only assure operation of the pumps under no load when cut off by the selector valve 47 but prevent pressure rise in the circuits above the settings at which said valves unload the pumps. The solenoid 48 is energized and de-energized by a timer 37 which operates in the same manner as the timer 37 in Fig. 1. Said valves 51 and 52 are, therefore, in the nature of bleeder valves to maintain desired pressures for actuation of the injection plunger 9.

Accordingly the preferred operation of the Fig. 3 embodiment of the invention is as follows.

With the reversing valve 41 in the position shown and with solenoid 48 de-energized, fluid under high pressure delivered by pump 49 will flow through valve 47, line 42, valve 41, and line 44 into cylinder 7 thus causing the injection plunger 9 to move toward the left and inject molding material into the mold. The initiation of the injection stroke starts the timing device 37 to run for its selected time period. At the end of such time period (after filling of mold with material and prior to separation of mold), the timer 37 energizes solenoid 48 whereupon the valve 47 is immediately shifted to cut off the delivery of the pump 49 to the injection cylinder 7 and to cause the pump 50 to deliver fluid at a lower pressure to said cylinder, said pump 50 being preferably set to the value "pressure setting of compensator" in Fig. 2. Such lower pressure delivered by pump 50 is maintained on the injection plunger 9 during the setting up of the material in the mold cavity.

Thereupon the reversing valve 41 is shifted to cause fluid under pressure to flow from line 42 through line 43 into the injection cylinder to return injection plunger 9 to its starting position. As previously indicated, the return of the plunger de-energizes the timing device 37 and solenoid 48 preparatory to repeating the cycle.

As apparent from the foregoing, the timer 37 in either embodiment of the invention may be of any desired form and while but two typical examples of pressure reducing devices or systems have been disclosed other equivalent devices may be employed such as for example those constituting the subject matter of my copending application Serial No. 105,252, filed July 16, 1949.

It will be noted that the elimination of the "flashing" of the mold is not the sole problem solved by the employment of the present method and apparatus but in addition, the application of high pressure on the material assures proper conditioning of the material and complete filling of the mold while the application of a reduced pressure on the material in the mold a predetermined time after the initiation of the injection stroke eliminates the problem of sticking of the molded article in the mold which has heretofore been remedied by application of reduced pressure on the material during the entire molding cycle but at the expense of inferior molded articles.

Moreover, while the foregoing description is primarily concerned with an injection molding method and apparatus it will be apparent to those skilled in the art that the same basic principles are applicable as well to extrusion molding, die casting, and transfer molding with regard to application of high pressure on the material while flowing into the mold and application and maintenance of reduced pressure on the material in the mold subsequent to filling of the mold.

Other modes of applying the principle of the invention may be employed, change being made as regards the details described, provided the features stated in any of the following claims, or the equivalent of such, be employed.

I therefore particularly point out and distinctly claim as my invention:

1. A mold overload compensator for molding machines of the character including a separable mold, a mold closing mechanism adapted to exert a predetermined force resisting opening of the mold during filling thereof, a chamber for molding material having restricted communication with said mold, and a hydraulically actuated injection plunger capable of exerting a pressure on material in a chamber sufficient to inject material from the chamber into the mold and to open the mold upon filling thereof in opposition to the closing force exerted by the mold closing mechanism, a pressure reducing device operative when energized to reduce the pressure exerted on the material by the injection plunger to a value insufficient to open the mold, and a timing device for energizing said pressure reducing device upon lapse of a selected time period following application of pressure on the material in the chamber by the injection plunger to inject the material into the mold and prior to the building up of the pressure of the material in the mold to a value sufficient to open the mold, said pressure reducing device comprising a relief valve connected in the motivating hydraulic circuit for the injection plunger and actuated by said timing device.

2. In a mold overload compensator for molding machines of the character including a separable mold, a hydraulically actuated mold closing mechanism, a chamber for molding material having restricted communication with the mold, a hydraulically actuated injection plunger in the chamber for injecting material from the chamber into the mold, a hydraulic system having a pump, valves selectively operative to supply fluid under pressure from the pump for actuating the mechanism and plunger, and a check valve between the pump and mechanism, the plunger, when actuated, being capable of exerting a pressure on the material exceeding the force exerted by the mechanism in holding the mold closed, the combination of a pressure reducing device connected in the hydraulic system between the pump and the plunger operative when energized to reduce the pressure of the fluid actuating the plunger, and a timing device for energizing said pressure reducing device upon lapse of a selected time period following actuation of the plunger to inject material into the mold and prior to the building up of the pressure of the material in the mold to a value sufficient to open the mold.

3. In a mold overload compensator for molding machines of the character including a separable mold, a hydraulically actuated mold closing mechanism, a chamber for molding material having restricted communication with the mold, a hydraulically actuated injection plunger in the chamber for injecting material from the chamber into the mold, a hydraulic system having a pump, valves selectively operative to supply fluid under pressure from the pump for actuating the mechanism and plunger, and a check valve between the pump and mechanism, the plunger, when actuated, being capable of exerting a pressure on the material exceeding the force exerted by the mechanism in holding the mold closed, the combination of a pressure reducing device connected in the hydraulic system between the pump and the plunger operative when energized to reduce the pressure of the fluid actuating the plunger, and a timing device for energizing said pressure reducing device upon lapse of a selected time period following actuation of the plunger to inject material into the mold and prior to the building up of the pressure of the material in the mold to a value sufficient to open the mold, said pressure reducing device comprising a relief valve of a form such that the fluid pressure in the hydraulic system flows therethrough to relieve fluid pressure over and above the setting of said valve only upon energization thereof by said timing device.

4. In a mold overload compensator for molding machines of the character including a separable mold, a hydraulically actuated mold closing mechanism, a chamber for molding material having restricted communication with the mold, a hydraulically actuated injection plunger in the chamber for injecting material from the chamber into the mold, a hydraulic system having a pump, valves selectively operative to supply fluid under pressure from the pump for actuating the mechanism and plunger, and a check valve between the pump and mechanism, the plunger, when actuated, being capable of exerting a pressure on the material exceeding the force exerted by the mechanism in holding the mold closed, the combination of a pressure reducing device connected in the hydraulic system between the pump and the plunger operative when energized to reduce the pressure of the fluid actuating the plunger, and a timing device for energizing said pressure reducing device upon lapse of a selected time period following actuation of the plunger to inject material into the mold and prior to the building up of the pressure of the material in the mold to a value sufficient to open the mold, said pressure reducing device comprising a relief valve, a solenoid operated pilot relief valve connected to said relief valve and isolated from the hydraulic system when the solenoid therein is de-energized and so arranged that when the solenoid is energized, fluid in the system flows through said relief valve to reduce the system pressure actuating the plunger, said timing device energizing said solenoid upon lapse of a time period as aforesaid.

5. A mold overload compensator for molding machines of the character including a separable mold, a mold closing mechanism adapted to exert a predetermined force resisting opening of the mold during filling thereof, a chamber for molding material having restricted communication with said mold, and an injection plunger capable of exerting a pressure on material in the chamber sufficient to inject material from the chamber into the mold and to open the mold upon filling thereof in opposition to the closing force exerted by the mold closing mechanism, fluid pressure means to actuate said injection plunger, means for delivering fluid under pressure to said actuating means, a motivating hydraulic circuit including a valve for controlling the flow of fluid to said actuating means, pressure reducing device operative when energized to reduce the pressure exerted on the material by the injection plunger to a value insufficient to open the mold, and a timing device for energizing said pressure reducing device upon lapse of a selected time period following application of pressure on the material in the chamber by the injection plunger to inject the material into the mold and prior to the building up of the pressure of the material in the mold to a value sufficient to open the mold, said pressure reducing device comprising a bleeder valve connected in the motivating hydraulic circuit for the injection plunger, to cause the fluid delivered by said delivery means to by-pass said actuating means and thus to maintain reduced pressure in the motivating hydraulic circuit, and said timing device being set to maintain said pressure reducing device energized during the solidification of the material in said mold, such solidification of the material under such reduced pressure facilitating removal of the molded article from said mold.

6. The mold overload compensator of claim 5 wherein said means for delivering fluid under pressure to said actuating means comprises first and second pressure-providing means operative to deliver fluid at different pressures to said actuating means, said first-named valve comprising a selector valve operative when energized to reduce the pressure exerted on the material by the injection plunger by communicating that pressure-providing means which delivers the fluid at lower pressure to said actuating means, and wherein said bleeder valve for said pressure reducing device is located between that pressure-providing means which delivers fluid at higher pressure and said selector valve and is operative to regulate the pressure to a value such that the pressure exerted on the material by the injection plunger is insufficient to open the mold.

NATHAN LESTER.

References Cited in the file of this patent

UNITED STATES PATENTS

| Number | Name | Date |
| --- | --- | --- |
| 2,035,801 | Gastrow | Mar. 31, 1936 |
| 2,187,212 | MacMillin | Jan. 16, 1940 |
| 2,372,833 | Jobst | Apr. 3, 1945 |
| 2,433,132 | Lester | Dec. 23, 1947 |
| 2,476,272 | Bauman | July 19, 1949 |